United States Patent [19]
Matsumoto

[11] 3,787,656
[45] Jan. 22, 1974

[54] CONTINUOUS WELDING METHOD AND APPARATUS THEREOF FOR METAL PLATES

[76] Inventor: Tatsuji Matsumoto, 7-96 Sakurazuka Hondori, Toyonaka-shi, Osaka-fu, Japan

[22] Filed: Feb. 22, 1972

[21] Appl. No.: 228,131

[52] U.S. Cl. ............................ 219/104, 219/107
[51] Int. Cl. ............................................ B23k 11/02
[58] Field of Search ..... 219/102, 104, 107, 101, 59, 219/67, 8.5, 9.5, 10.53, 10.79

[56] References Cited
UNITED STATES PATENTS

| | | | |
|---|---|---|---|
| 3,513,284 | 5/1970 | Snyder | 219/102 |
| 2,931,885 | 4/1960 | Underwood | 219/102 X |
| 3,140,378 | 7/1964 | Benninghoff | 219/107 X |
| 3,610,869 | 10/1971 | Ito et al. | 219/107 |
| 3,497,662 | 2/1970 | Rudd et al. | 219/107 X |

Primary Examiner—C. L. Albritton

[57] ABSTRACT

The continuous welding method comprised the steps of feeding or forwarding three metal plates continuously together with approaching them one another so as to unite them at the predetermined position through a high frequency induction heating device and contractors positioned in front of the uniting position, passing the feeding metal plate vertically through the high frequency induction heating device of a predetermined width without contacting them each other, and advancing the two remaining metal plates with contacting the welding end edges of the remaining metal plates with the contractors so as to weld the three metal plates one another at the uniting position. The continuous welding apparatus for three metal plates comprises a high frequency induction heating device having two heating side plates, two contractors arranged on the two metal plates, pressure rollers integrating and uniting the three metal plates at a predetermined uniting position, and holding rollers holding the vertical plate in vertical position so as to weld the three metal plates one another at the uniting position.

2 Claims, 4 Drawing Figures

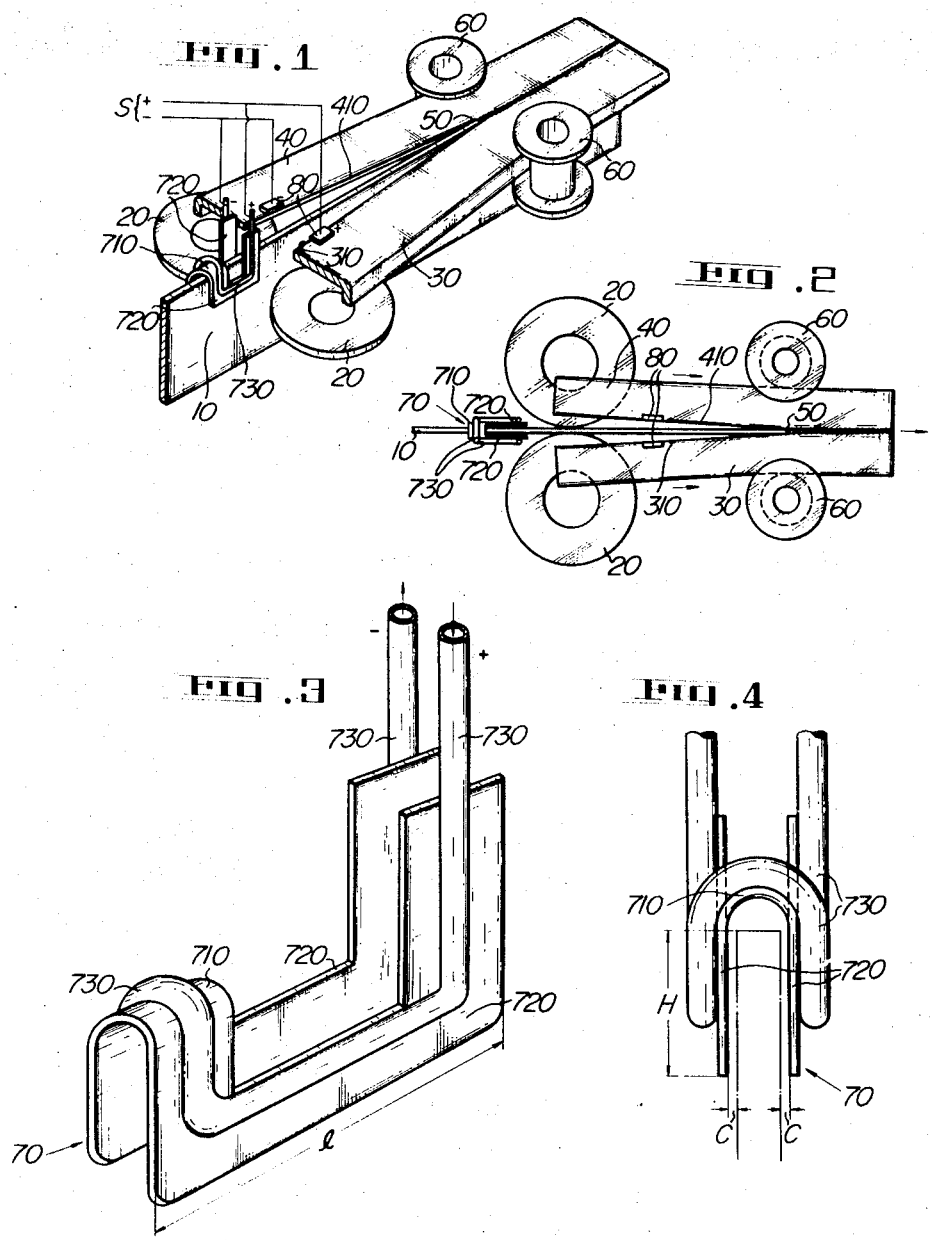

CONTINUOUS WELDING METHOD AND APPARATUS THEREOF FOR METAL PLATES

FIELD OF THE INVENTION

This invention relates generally to a welding method and a welding apparatus for metal plates, and more particularly to a new and improved method and apparatus for welding three metal plates continuously, wherein the three metal plates to be welded are approached one another together with advancing of them, and are fed to the predetermined uniting position, and a high frequency induction heating device and contractors are arranged in front of the uniting position, the particular metal plate fed vertically passes through the high frequency induction heating device without contacting with the heating device and the two remaining metal plates are advanced with contacting the welding edges of the plates with the contractors, thereby the three metal plates are welded continuously at the uniting position.

SUMMARY AND OBJECTS OF THE INVENTION

The present invention contemplates the provision of a continuous welding method for metal plates comprising the steps of feeding or forwarding three metal plates continuously together with approaching them one another so as to unite them at a predetermined position through a high frequency induction heating device and contactors positioned in front of the uniting position, passing the metal plate to be fed vertically through the high frequency induction heating device of a predetermined width without contacting them with each other, and advancing the two remaining metal plates with contacting the welding edges of the plates with the contractors, thereby the three metal plates are welded one another at the uniting position. The present invention also contemplates the provision of a continuous welding apparatus for metal plates comprising a high frequency induction heating device, two contractors arranged so as to contact with the two metal plates, pressure rollers uniting the three metal plates at a predetermined uniting position, and holding rollers holding the vertical plate in vertical position so as to weld the three metal plates one another at the meeting position.

An object of the invention is to provide a new and improved continuous welding method comprising the steps of feeding or forwarding three metal plates continuously together with or simultaneously approaching them one another so as to unite them at a predetermined position through a high frequency induction heating device and contactors positioned in front of the uniting position, passing the metal plate to be fed vertically through the high frequency induction heating device of a predetermined width without contacting them with each other, and advancing the two remaining metal plates with contacting the welding edges of the plates with the contractors, so as to weld the three metal plates one another at the uniting position.

Another object of the present invention is to provide a new and improved continuous welding apparatus for three metal plates comprising a high frequency induction heating device having two heating side plates, two contractors positioned or arranged on the two metal plates, pressure rollers integrating and uniting the three metal plates at a predetermined uniting position, holding rollers holding the vertical plate in vertical position as to weld the three metal plates at the uniting position, and a high frequenct source connected with the heating device and the contractors.

BRIEF DESCRIPTION OF THE DRAWINGS

FIG. 1 is a prespective view showing an embodiment of the continuous welding method and apparatus thereof for three metal plates according to the present invention.

FIG. 2 is a front view of FIG. 1.

FIG. 3 is an enlarged perspective view showing a induction heating panel or device.

FIG. 4 is a front view of FIG. 3.

DETAILED EXPLANATION OF THE PREFERED EMBODIMENT

The present invention is used to weld a vertical web plate to two horizontal flange plates so as to form T-shape construction metal material or to weld an additional two flange plates to such T-shape construction metal material to form H-shape construction metal material. Also, the present invention is employed to form various kinds of shape steel or frame material for construction.

The present invention will be hereinafter more fully pointed out with reference to a continuous welding method and welding apparatus for T-shape steel having lips.

In the accompanying drawing and particularly with reference to FIGS. 1 and 2 at this time, the web metal Plate is illustrated with reference number 10 and is held vertically by means of a suitable supporting means such as rollers 20 so as to advance along the predetermined path. The web metal plate 10 and the flange metal plates 30, 40 separated longitudinally and arranged symmetrically in section are advanced and simultaneously approached one another by means of a suitable jig (not shown), thereby the web plate 10 and the flange plates 30, 40 are fed and united at a predetermined position 50. The plates 10, 30 and 40 are united and integrated at the predetermined meeting position 50 by means of pressure rollers 60.

Reference numeral 70 indicates an induction heating panel or a high frequency induction heating device arranged in just front of the uniting position 50. The high frequency induction heating panel 70 is constituted with two side plates 720, 720 connected each other by a bridge member 710 and a pipe 730 mounted and curved along the each faces of one side panel 720, the bridge member 710 and the other side panel 720. The induction heating panel 70 is supported and held in a position by means of a suitable supporting device (not shown).

The end portions of the pipe 730 are extended and arranged on the outside of the advancing path of the metal plates so as not to prevent the metal plates from advancing. The pipe 730 is an electrode and connected with two terminals of a high frequency electrical source S so as to flow electricity in the induction heating panel and to heat the metal plate 10. Cooling water flows in the pipe 730 from position (+) to position (−) as shown in FIG. 1. The upper longitudinal edge of the metal plate 10 advances straightly between the side plates 720, 720 without contacting the metal plate with side plates.

A variety of space or gap C between the metal plate 10 and one of the side plates is determined according to the various conditions such as a quality and a thickness of the metal plate, a length 1 of the side plate 720 and a height H of the metal plate 10 sandwiched in between the side plates 720. In general, when the smaller of the gaps C between the metal plate 10 and the side plates 720, the more heating the metal plate 10 and when the greater of the gaps C, the less heating the metal plate 10.

Also, the more lengths 1 of the side plates 720 sandwiching the metal plate 10, the more heating the metal plate 10 and, on the contrary, the less lengths 1 of the side plates 720, the less heating the metal plate 10.

When the length H of the metal plate 10 sandwiched by the side plate 720 or of the side plate 720 sandwiching the metal plate 10 is increaced, the more width of the metal plate is heated and when the length H is decreaced, the less width of the metal plate is heated. Accordingly, the length H of the metal plate 10 is adjusted according to the quality and/or thickness of the metal plate 10, thereby the metal plate 10 is heated to the temperature which is suitable to weld at the uniting position of the three metal plates.

The contactor 80 is connected with the two terminals of said high frequency electrical source S and contacts with the respective end edges to be welded of the web metal plates 30, 40. The end edges 310, 410 of the metal plates 30, 40 are adapted to advance with contacting with the contactors 80 so as to pass high frequency through and along the end edges 310, 410, thereby the end edges are heated to a welding temperature and the three metal plates are welded at the uniting position.

As described fully above, the present invention is adapted to feed or forward three metal plates 10, 30 and 40 continuously together with approaching them one another so as to unite them at the predetermined position, to advance the flange metal plates 30, 40 with contacting the end edges 310, 410 of the frange metal plates 30, 40, and to heat them to welding temperature by means of passing high frequency through or along the end edges of the frange metal plates, thereby the three metal plates are welded continuously at the meeting position. According to the welding method and welding machine of the present invention, a various of shape steel and frame steel for construction such as T-shape steel and H-shape steel are formed continuously and economically.

The electric power consumption to be used for welding the three metal plates according to the invention is controlled by selecting the condition of the materials to be welded such as thicknesses of the respective metal plates and the electricity to be used for welding is also adjusted by selecting the size of the high frequency induction heating device or, in particularly, the size of the heating side plates in relation to the size of the metal plates to be welded.

What I claim is:

1. A welding method comprising in combination: employing at least three separate first, second and third elongated metal-sheet strips extending in a substantially common direction, the first strip having a first elongated edge-face and third strip having a second elongated edge-face extending in said common direction substantially parallel to and opposingly-adjacent and spaced from the first elongated edge-face, the second strip having opposite first and second substantially planar surfaces, and first and second edge-faces each respectively being of composition that may be one heat-fuse-welded to one of the first and second planar surfaces each respectively; aligning the first elongated edge-face for future flush contact with and spaced-from the first planar surface and aligning the second edge-face for future flush contact with and spaced from the second planar surface such that the aligned first elongated edge-face may be heat-fused-welded to the first planar-surface and such that substantially concurrently the aligned second elongated edge-face may be heat-fuse-welded to the second planar-surface; electricity-induction heating substantially simultaneously said second strip sufficiently that the first and second planar surfaces respectively may be heat-fuse-welded to the first and second edge-faces respectively one edge-face per planar surface; thereafter substantially simultaneously (1) first-pressing and thereby heat-fuse-welding the first elongated edge-face substantially flushly into contact with the induction-heated first planar surface and (2) second-pressing and thereby heat-fuse-welding the second elongated edge-face substantially flushly into contact with the induction-heated second planar surface.

2. A welding method of claim 1, in which each of the first and third strips includes an outer elongated edge-face on an edge opposite from its own respective one of said first elongated edge-face and said second elongated edge-face, and including during said first-pressing and second second-pressing, applying separate forces inwardly against respective ones of said outer edge-faces in inward directions toward one-another such that each of said first and third strips are urged toward one-another into firm fuse-welding contact with said second strip's first and second indunction-heated surfaces each respectively.

* * * * *